US012172444B2

(12) United States Patent
Wright et al.

(10) Patent No.: US 12,172,444 B2
(45) Date of Patent: Dec. 24, 2024

(54) HIGH RELIABILITY SHEATHED TRANSPORT PATH FOR AEROSOL JET DEVICES

(71) Applicant: Optomec, Inc., Albuquerque, NM (US)

(72) Inventors: John S. Wright, Edina, MN (US); Chad Michael Conroy, Minneapolis, MN (US); Kurt K. Christenson, Minnetonka, MN (US); John David Hamre, Plymouth, MN (US)

(73) Assignee: Optomec, Inc., Albuquerque, NM (US)

( * ) Notice: Subject to any disclaimer, the term of this patent is extended or adjusted under 35 U.S.C. 154(b) by 0 days.

(21) Appl. No.: 18/288,534

(22) PCT Filed: Apr. 29, 2022

(86) PCT No.: PCT/US2022/027078
§ 371 (c)(1),
(2) Date: Oct. 26, 2023

(87) PCT Pub. No.: WO2022/232608
PCT Pub. Date: Nov. 3, 2022

(65) Prior Publication Data

US 2024/0227399 A1 Jul. 11, 2024

Related U.S. Application Data

(60) Provisional application No. 63/181,736, filed on Apr. 29, 2021.

(51) Int. Cl.
*B41J 2/165* (2006.01)
*B05B 7/04* (2006.01)
(Continued)

(52) U.S. Cl.
CPC ............ *B41J 2/165* (2013.01); *B05B 7/0491* (2013.01); *B05B 7/12* (2013.01); *B05B 7/1486* (2013.01);
(Continued)

(58) Field of Classification Search
CPC .......... B05B 15/58; B05B 7/12; B05B 7/1486
See application file for complete search history.

(56) References Cited

U.S. PATENT DOCUMENTS 3,474,971 A 10/1969 Goodrich
3,590,477 A 7/1971 Cheroff et al.
(Continued)

FOREIGN PATENT DOCUMENTS

CA 2131248 3/1996
CN 2078199 6/1991
(Continued)

OTHER PUBLICATIONS

Webster's Ninth New Collegiate Dictionary, 1990, 744.
(Continued)

*Primary Examiner* — Nathan T Leong
(74) *Attorney, Agent, or Firm* — Philip D. Askenazy; Peacock Law P.C.

(57) ABSTRACT

An apparatus and method for depositing an aerosol that has an ultrafast pneumatic, shutter. The flow of aerosol through the entire deposition flow path is surrounded by at least one sheath gas, thereby greatly increasing reliability. The distance between the aerosol switching chamber and a reverse gas flow chamber input is minimized to reduce switching time. The distance from the switching chamber to the nozzle exit is also minimized to reduce switching time. The gas flows in the system are configured to maintain a substantially constant pressure in the system, and consequently substantially constant flow rates through the deposition
(Continued)

nozzle and exhaust nozzle, to minimize on/off switching times. This enables the system to have a switching time of less than 10 ms.

14 Claims, 7 Drawing Sheets

(51) Int. Cl.
*B05B 7/12* (2006.01)
*B05B 7/14* (2006.01)
*B05B 15/58* (2018.01)
*B41J 2/14* (2006.01)

(52) U.S. Cl.
CPC ................. *B05B 15/58* (2018.02); *B41J 2/14* (2013.01); *B41J 2002/14475* (2013.01); *B41J 2/16502* (2024.05)

(56) References Cited

U.S. PATENT DOCUMENTS 3,642,202 A 2/1972 Angelo
3,715,785 A 2/1973 Brown et al.
3,777,983 A 12/1973 Hibbins
3,808,550 A 3/1974 Ashkin
3,808,432 A 4/1974 Ashkin
3,816,025 A 6/1974 O'Neill
3,846,661 A 11/1974 Brown et al.
3,854,321 A 12/1974 Dahneke
3,901,798 A 8/1975 Peterson
3,959,798 A 5/1976 Hochberg et al.
3,974,769 A 8/1976 Hochberg et al.
3,982,251 A 9/1976 Hochberg
4,004,733 A 1/1977 Law
4,016,417 A 4/1977 Benton
4,019,188 A 4/1977 Hochberg et al.
4,034,025 A 7/1977 Martner
4,036,434 A 7/1977 Anderson et al.
4,046,073 A 9/1977 Mitchell et al.
4,046,074 A 9/1977 Hochberg et al.
4,073,436 A 2/1978 Behr
4,092,535 A 5/1978 Ashkin et al.
4,112,437 A 9/1978 Mir et al.
4,132,894 A 1/1979 Yule
4,171,096 A 10/1979 Welsh et al.
4,200,669 A 4/1980 Schaefer et al.
4,228,440 A 10/1980 Horike et al.
4,235,563 A 11/1980 Hine et al.
4,269,868 A 5/1981 Livsey
4,323,756 A 4/1982 Brown et al.
4,400,408 A 8/1983 Asano et al.
4,453,803 A 6/1984 Hidaka et al.
4,485,387 A 11/1984 Drumheller
4,497,692 A 2/1985 Gelchinski et al.
4,601,921 A 7/1986 Lee
4,605,574 A 8/1986 Yonehara et al.
4,619,836 A 10/1986 Prabhu et al.
4,670,135 A 6/1987 Marple et al.
4,685,563 A 8/1987 Cohen et al.
4,689,052 A 8/1987 Ogren et al.
4,694,136 A 9/1987 Kasner et al.
4,724,299 A 2/1988 Hammeke
4,733,018 A 3/1988 Prabhu et al.
4,772,488 A 9/1988 Pinch et al.
4,823,009 A 4/1989 Biemann et al.
4,825,299 A 4/1989 Okada et al.
4,826,583 A 5/1989 Biernaux et al.
4,893,886 A 1/1990 Ashkin et al.
4,904,621 A 2/1990 Loewenstein et al.
4,911,365 A 3/1990 Thiel et al.
4,917,830 A 4/1990 Ortiz et al.
4,920,254 A 4/1990 Decamp et al.
4,927,992 A 5/1990 Whitlow et al.
4,947,463 A 8/1990 Matsuda et al.
4,971,251 A 11/1990 Dobrick et al.
4,978,067 A 12/1990 Berger et al.
4,997,809 A 3/1991 Gupta
5,032,850 A 7/1991 Andeen et al.
5,038,014 A 8/1991 Pratt et al.
5,043,548 A 8/1991 Whitney et al.
5,064,685 A 11/1991 Kestenbaum et al.
5,126,102 A 6/1992 Takahashi et al.
5,164,535 A 11/1992 Leasure
5,170,890 A 12/1992 Wilson et al.
5,173,220 A 12/1992 Reiff et al.
5,176,328 A 1/1993 Alexander
5,176,744 A 1/1993 Muller
5,182,430 A 1/1993 Lagain
5,194,297 A 3/1993 Scheer et al.
5,208,431 A 5/1993 Uchiyama et al.
5,245,404 A 9/1993 Jannson et al.
5,250,383 A 10/1993 Naruse
5,254,832 A 10/1993 Gartner et al.
5,270,542 A 12/1993 McMurry et al.
5,292,418 A 3/1994 Morita et al.
5,294,459 A 3/1994 Hogan et al.
5,306,447 A 4/1994 Harris et al.
5,322,221 A 6/1994 Anderson
5,335,000 A 8/1994 Stevens
5,343,434 A 8/1994 Noguchi
5,344,676 A 9/1994 Kim et al.
5,359,172 A 10/1994 Kozak et al.
5,366,559 A 11/1994 Periasamy
5,378,505 A 1/1995 Kubota et al.
5,378,508 A 1/1995 Castro et al.
5,393,613 A 2/1995 MacKay
5,398,193 A 3/1995 DeAngelis
5,403,617 A 4/1995 Haaland
5,405,660 A 4/1995 Psiuk et al.
5,418,350 A 5/1995 Freneaux et al.
5,425,802 A 6/1995 Burton et al.
5,449,536 A 9/1995 Funkhouser
5,477,026 A 12/1995 Buongiorno
5,486,676 A 1/1996 Aleshin
5,491,317 A 2/1996 Pirl
5,495,105 A 2/1996 Nishimura et al.
5,512,745 A 4/1996 Finer et al.
5,518,680 A 5/1996 Cima et al.
5,524,828 A 6/1996 Raterman et al.
5,528,154 A 6/1996 Leichner et al.
5,529,634 A 6/1996 Miyata et al.
5,547,094 A 8/1996 Bartels et al.
5,578,227 A 11/1996 Rabinovich
5,607,730 A 3/1997 Ranalli
5,609,921 A 3/1997 Gitzhofer et al.
5,612,099 A 3/1997 Thaler
5,614,252 A 3/1997 McMillan et al.
5,634,093 A 5/1997 Ashida et al.
5,648,127 A 7/1997 Turchan et al.
5,653,925 A 8/1997 Batchelder
5,676,719 A 10/1997 Stavropoulos et al.
5,697,046 A 12/1997 Conley
5,705,117 A 1/1998 O'Connor et al.
5,707,715 A 1/1998 Derochemont et al.
5,732,885 A 3/1998 Huffman
5,733,609 A 3/1998 Wang
5,736,195 A 4/1998 Haaland
5,742,050 A 4/1998 Amirav et al.
5,775,402 A 4/1998 Sachs et al.
5,746,844 A 5/1998 Sterett et al.
5,770,272 A 6/1998 Biemann et al.
5,772,106 A 6/1998 Ayers et al.
5,772,963 A 6/1998 Prevost et al.
5,772,964 A 6/1998 Prevost et al.
5,779,833 A 7/1998 Cawley et al.
5,795,388 A 8/1998 Oudard
5,814,152 A 9/1998 Thaler
5,837,960 A 11/1998 Lewis et al.
5,844,192 A 12/1998 Wright et al.
5,847,357 A 12/1998 Woodmansee et al.
5,849,238 A 12/1998 Schmidt et al.
5,854,311 A 12/1998 Richart
5,861,136 A 1/1999 Glicksman et al.

(56) References Cited

U.S. PATENT DOCUMENTS 5,882,722 A 3/1999 Kydd
5,894,403 A 4/1999 Shah et al.
5,940,099 A 8/1999 Karlinski
5,958,268 A 9/1999 Engelsberg et al.
5,965,212 A 10/1999 Dobson et al.
5,980,998 A 11/1999 Sharma et al.
5,993,549 A 11/1999 Kindler et al.
5,993,554 A 11/1999 Keicher et al.
5,997,956 A 12/1999 Hunt et al.
6,007,631 A 12/1999 Prentice et al.
6,015,083 A 1/2000 Hayes et al.
6,021,776 A 2/2000 Allred et al.
6,025,037 A 2/2000 Wadman et al.
6,036,889 A 3/2000 Kydd
6,040,016 A 3/2000 Mitani et al.
6,046,426 A 4/2000 Jeantette et al.
6,056,994 A 5/2000 Paz De Araujo et al.
6,110,144 A 8/2000 Choh et al.
6,116,718 A 9/2000 Peeters et al.
6,136,442 A 10/2000 Wong
6,143,116 A 11/2000 Hayashi et al.
6,144,008 A 11/2000 Rabinovich
6,149,076 A 11/2000 Riney
6,151,435 A 11/2000 Pilloff
6,159,749 A 12/2000 Liu
6,169,605 B1 1/2001 Penn et al.
6,176,647 B1 1/2001 Itoh
6,182,688 B1 2/2001 Fabre
6,183,690 B1 2/2001 Yoo et al.
6,197,366 B1 3/2001 Takamatsu
6,251,488 B1 6/2001 Miller et al.
6,258,733 B1 7/2001 Solayappan et al.
6,265,050 B1 7/2001 Wong et al.
6,267,301 B1 7/2001 Haruch
6,268,584 B1 7/2001 Keicher et al.
6,290,342 B1 9/2001 Vo et al.
6,291,088 B1 9/2001 Wong
6,293,659 B1 9/2001 Floyd et al.
6,318,642 B1 11/2001 Goenka et al.
6,328,026 B1 12/2001 Wang et al.
6,340,216 B1 1/2002 Peeters et al.
6,348,687 B1 2/2002 Brockmann et al.
6,349,668 B1 2/2002 Sun et al.
6,355,533 B2 3/2002 Lee
6,379,745 B1 4/2002 Kydd et al.
6,384,365 B1 5/2002 Seth et al.
6,390,115 B1 5/2002 Rohwer et al.
6,391,251 B1 5/2002 Keicher et al.
6,391,494 B2 5/2002 Reitz et al.
6,405,095 B1 6/2002 Jang et al.
6,406,137 B1 6/2002 Okazaki et al.
6,410,105 B1 6/2002 Mazumder et al.
6,416,156 B1 7/2002 Noolandi et al.
6,416,157 B1 7/2002 Peeters et al.
6,416,158 B1 7/2002 Floyd et al.
6,416,159 B1 7/2002 Floyd et al.
6,416,389 B1 7/2002 Perry et al.
6,454,384 B1 9/2002 Peeters et al.
6,467,862 B1 10/2002 Peeters et al.
6,471,327 B2 10/2002 Jagannathan et al.
6,481,074 B1 11/2002 Karlinski
6,486,432 B1 11/2002 Colby et al.
6,503,831 B2 1/2003 Speakman
6,513,736 B1 2/2003 Skeath et al.
6,520,996 B1 2/2003 Manasas et al.
6,521,297 B2 2/2003 McDougall et al.
6,537,501 B1 3/2003 Holl et al.
6,544,599 B1 4/2003 Brown et al.
6,548,122 B1 4/2003 Sharma et al.
6,564,038 B1 5/2003 Bethea et al.
6,572,033 B1 6/2003 Pullagura et al.
6,573,491 B1 6/2003 Marchitto et al.
6,607,597 B2 8/2003 James et al.
6,608,281 B2 8/2003 Ishide et al.
6,636,676 B1 10/2003 Renn
6,646,253 B1 11/2003 Rohwer et al.
6,656,409 B1 12/2003 Keicher et al.
6,697,694 B2 2/2004 Mogensen
6,772,649 B2 8/2004 Zimmermann et al.
6,774,338 B2 8/2004 Baker et al.
6,780,377 B2 8/2004 Hall et al.
6,811,744 B2 11/2004 Keicher et al.
6,811,805 B2 11/2004 Gilliard et al.
6,823,124 B1 11/2004 Renn et al.
6,855,631 B2 2/2005 Kirby
6,890,624 B1 5/2005 Kambe et al.
6,921,626 B2 7/2005 Ray et al.
6,998,345 B2 2/2006 Kirby
6,998,785 B1 2/2006 Silfvast et al.
7,009,137 B2 3/2006 Guo et al.
7,045,015 B2 5/2006 Renn et al.
7,108,894 B2 9/2006 Renn
7,164,818 B2 1/2007 Bryan et al.
7,171,093 B2 1/2007 Kringlebotn et al.
7,178,380 B2 2/2007 Shekarriz et al.
7,270,844 B2 9/2007 Renn
7,294,366 B2 11/2007 Renn et al.
7,402,897 B2 7/2008 Leedy
7,469,558 B2 12/2008 Demaray et al.
7,485,345 B2 2/2009 Renn et al.
7,658,163 B2 2/2010 Renn et al.
7,674,671 B2 3/2010 Renn et al.
7,836,922 B2 11/2010 Poole et al.
7,938,079 B2 5/2011 King et al.
7,987,813 B2 8/2011 Renn et al.
8,012,235 B2 9/2011 Takashima et al.
8,383,014 B2 2/2013 Vandeusden et al.
8,796,146 B2 8/2014 Renn et al.
8,887,658 B2 11/2014 Essien et al.
8,916,084 B2 12/2014 Chretien et al.
8,919,899 B2 12/2014 Essien
9,694,389 B2 7/2017 Fan et al.
10,058,881 B1 8/2018 Keicher et al.
2001/0027011 A1 10/2001 Hanaoka et al.
2001/0046551 A1 11/2001 Falck et al.
2002/0012743 A1 1/2002 Sampath et al.
2002/0012752 A1 1/2002 McDougall et al.
2002/0063117 A1 5/2002 Church et al.
2002/0071934 A1 6/2002 Marutsuka
2002/0082741 A1 6/2002 Mazumder et al.
2002/0096647 A1 7/2002 Moors et al.
2002/0100416 A1 8/2002 Sun et al.
2002/0107140 A1 8/2002 Hampden-Smith et al.
2002/0128714 A1 9/2002 Manasas et al.
2002/0132051 A1 9/2002 Choy
2002/0145213 A1 10/2002 Liu et al.
2002/0162974 A1 11/2002 Orsini et al.
2003/0003241 A1 1/2003 Suzuki et al.
2003/0020768 A1 1/2003 Renn
2003/0032214 A1 2/2003 Huang
2003/0048314 A1 3/2003 Renn
2003/0108511 A1 6/2003 Sawhney
2003/0108664 A1 6/2003 Kodas et al.
2003/0117691 A1 6/2003 Bi et al.
2003/0138967 A1 7/2003 Hall et al.
2003/0149505 A1 8/2003 Mogensen
2003/0175411 A1 9/2003 Kodas et al.
2003/0180451 A1 9/2003 Kodas et al.
2003/0202043 A1 10/2003 Moffat et al.
2003/0219923 A1 11/2003 Nathan et al.
2003/0228124 A1 12/2003 Renn et al.
2004/0004209 A1 1/2004 Matsuba et al.
2004/0029706 A1 2/2004 Barrera et al.
2004/0038808 A1 2/2004 Hampden-Smith et al.
2004/0080917 A1 4/2004 Steddom et al.
2004/0151978 A1 8/2004 Huang
2004/0161872 A1 8/2004 Gonsiorawski et al.
2004/0179808 A1 9/2004 Renn
2004/0185388 A1 9/2004 Hirai
2004/0191695 A1 9/2004 Ray et al.
2004/0197493 A1 10/2004 Renn et al.
2004/0227227 A1 11/2004 Imanaka et al.
2004/0247782 A1 12/2004 Hampden-Smith et al.
2005/0002818 A1 1/2005 Ichikawa

(56) References Cited

U.S. PATENT DOCUMENTS

2005/0003658 A1 1/2005 Kirby
2005/0046664 A1 3/2005 Renn
2005/0097987 A1 5/2005 Kodas et al.
2005/0101129 A1 5/2005 Lirby
2005/0110064 A1 5/2005 Duan et al.
2005/0129383 A1 6/2005 Renn et al.
2005/0133527 A1 6/2005 Dullea et al.
2005/0145968 A1 7/2005 Goela et al.
2005/0147749 A1 7/2005 Liu et al.
2005/0156991 A1 7/2005 Renn
2005/0163917 A1 7/2005 Renn
2005/0171237 A1 8/2005 Patel et al.
2005/0184328 A1 8/2005 Uchiyama et al.
2005/0205415 A1 9/2005 Belousov et al.
2005/0205696 A1 9/2005 Saito et al.
2005/0214480 A1 9/2005 Garbar et al.
2005/0215689 A1 9/2005 Garbar et al.
2005/0238804 A1 10/2005 Garbar et al.
2005/0247681 A1 11/2005 Boillot et al.
2005/0275143 A1 12/2005 Toth
2006/0003095 A1 1/2006 Bullen et al.
2006/0008590 A1 1/2006 King et al.
2006/0035033 A1 2/2006 Tanahashi
2006/0043598 A1 3/2006 Kirby et al.
2006/0046347 A1 3/2006 Wood et al.
2006/0046461 A1 3/2006 Benson et al.
2006/0057014 A1 3/2006 Oda et al.
2006/0116000 A1 6/2006 Yamamoto
2006/0159899 A1 7/2006 Edwards et al.
2006/0162424 A1 7/2006 Shekarriz et al.
2006/0163570 A1 7/2006 Renn et al.
2006/0163744 A1 7/2006 Vanheusden et al.
2006/0172073 A1 8/2006 Groza et al.
2006/0175431 A1 8/2006 Renn et al.
2006/0189113 A1 8/2006 Vanheusden et al.
2006/0233953 A1 10/2006 Renn et al.
2006/0280866 A1 12/2006 Marquez et al.
2007/0019028 A1 1/2007 Renn et al.
2007/0128905 A1 6/2007 Speakman
2007/0154634 A1 7/2007 Renn
2007/0181060 A1 8/2007 Renn et al.
2007/0227536 A1 10/2007 Rivera et al.
2007/0240454 A1 10/2007 Brown
2008/0013299 A1 1/2008 Renn
2008/0099456 A1 5/2008 Schwenke et al.
2009/0039249 A1 2/2009 Wang et al.
2009/0061077 A1 3/2009 King et al.
2009/0061089 A1 3/2009 King et al.
2009/0090298 A1 4/2009 King et al.
2009/0114151 A1 5/2009 Renn et al.
2009/0229412 A1 9/2009 Takashima et al.
2009/0252874 A1 10/2009 Essien
2010/0112234 A1 6/2010 Spatz et al.
2010/0140811 A1 6/2010 Leal et al.
2010/0173088 A1* 7/2010 King ...................... F23D 11/16
118/58
2010/0192847 A1 8/2010 Renn et al.
2010/0255209 A1 10/2010 Renn et al.
2011/0129615 A1 6/2011 Renn et al.
2012/0038716 A1 2/2012 Hoerteis et al.
2012/0038717 A1 2/2012 Niemiro et al.
2012/0165969 A1 6/2012 Elsey
2012/0177319 A1 7/2012 Alemohammad et al.
2013/0029032 A1 1/2013 King et al.
2013/0260056 A1 10/2013 Renn et al.
2013/0283700 A1 10/2013 Bajaj et al.
2014/0027952 A1 1/2014 Fan et al.
2014/0035975 A1 2/2014 Essien et al.
2014/0035995 A1 2/2014 Chou et al.
2014/0342082 A1 11/2014 Renn
2015/0022874 A1 1/2015 Martin et al.
2015/0217517 A1 8/2015 Karpas
2015/0273510 A1 10/2015 Hoey
2016/0009030 A1 1/2016 Mark et al.
2016/0172741 A1 6/2016 Panat et al.
2016/0193627 A1 7/2016 Essien
2016/0229119 A1 8/2016 Renn
2016/0242296 A1 8/2016 Deangelis
2017/0348903 A1 12/2017 Renn et al.
2018/0015730 A1* 1/2018 Essien .................. B41J 2/17596
2019/0143678 A1* 5/2019 Christenson ............. B41J 2/175
239/11
2020/0122461 A1 4/2020 Christenson et al.

FOREIGN PATENT DOCUMENTS

| | | | |
|---|---|---|---|
| CN | 1320485 | | 11/2001 |
| CN | 1452554 | | 10/2003 |
| CN | 101098734 | A | 1/2008 |
| CN | 101111129 | | 1/2008 |
| CN | 108372036 | A | 8/2018 |
| CN | 111655382 | A | 9/2020 |
| CN | 112519417 | A | 3/2021 |
| DE | 03541999 | | 6/1987 |
| DE | 19841401 | | 4/2000 |
| EP | 0331022 | A2 | 9/1989 |
| EP | 0444550 | A2 | 9/1991 |
| EP | 0555896 | A1 | 8/1993 |
| EP | 0470911 | | 7/1994 |
| EP | 0950502 | A2 | 10/1999 |
| EP | 1163552 | A1 | 12/2001 |
| EP | 1258293 | | 11/2002 |
| EP | 1452326 | | 9/2004 |
| EP | 1507832 | A1 | 2/2005 |
| EP | 1670610 | | 6/2006 |
| GB | 2322735 | | 9/1998 |
| JP | 53060116 | | 10/1976 |
| JP | 58061854 | | 4/1983 |
| JP | 05318748 | | 12/1993 |
| JP | 06116743 | | 4/1994 |
| JP | 8156106 | | 6/1996 |
| JP | 2000167446 | | 6/2000 |
| JP | 2001507449 | | 6/2001 |
| JP | 2002539924 | | 11/2002 |
| JP | 3425522 | | 7/2003 |
| JP | 2004122341 | | 4/2004 |
| JP | 2006051413 | | 2/2006 |
| JP | 2007507114 | | 3/2007 |
| KR | 20000013770 | | 3/2000 |
| KR | 1002846070000 | | 8/2001 |
| KR | 1020070008614 | | 1/2007 |
| KR | 1020070008621 | | 1/2007 |
| KR | 1020070019651 | | 2/2007 |
| TW | 200636091 | | 10/2006 |
| WO | 9218323 | | 10/1992 |
| WO | 9633797 | | 10/1996 |
| WO | 9716274 | | 5/1997 |
| WO | 9738810 | | 10/1997 |
| WO | 0023825 | | 4/2000 |
| WO | 0069235 | | 11/2000 |
| WO | 0183101 | A1 | 11/2001 |
| WO | 2005075132 | A1 | 8/2005 |
| WO | 2006001791 | A1 | 1/2006 |
| WO | 2006041657 | A2 | 4/2006 |
| WO | 2006065978 | | 6/2006 |
| WO | 2006076603 | | 7/2006 |
| WO | 2013010108 | | 1/2013 |
| WO | 2013162856 | | 10/2013 |
| WO | 2020149741 | A2 | 7/2020 |

OTHER PUBLICATIONS

"Harrick Plasma: About Plasma: Overall Plsma Advantages", http://www.harrickplasma.com/plasma_advantages.php, 2004.
"Harrick Plasma: About Plasma: Plasma Process Gases", http://www.harrickplasma.com/plasma_process_gasses.php, 2004.
"Harrick Plasma: About Plasma: Plasma-Surface Interaction", http://www.harrickplasma.com/plasma_surface_interaction.php, 2004.
"Harrick Plasma: About Plasma: The Physics of Plasma", http://www.harrickplasma.com/plasma_physics.php, 2004.
Ashkin, A , "Acceleration and Trapping of Particles by Radiation Pressure", Physical Review Letters, Jan. 26, 1970, 156-159.

(56) References Cited

OTHER PUBLICATIONS

Ashkin, A. , "Optical trapping and manipulation of single cells using infrared laser beams", Nature, Dec. 1987, 769-771.
Curtis, C. J., et al., "Multi-Layer Inkjet Printed Contacts For Silicon Solar Cells", Conference paper, 2006 IEEE 4th World Conference on Photovoltaic Energy Conversion, Waikoloa, Hawaii, May 2006, 1-3.
Dolenc, A. , "An Overview of Rapid Prototyping Technologies in Manufacturing", http://swhite.me.washington.edu/~ganter/me480/rp.pdf, Jul. 24, 1994, 1-23.
Dykhuizen, R. C., "Impact of High Velocity Cold Spray Particles", May 13, 2000, 1-18.
Fernandez De La Mora, J. , et al., "Aerodynamic focusing of particles in a carrier gas", J. Fluid Mech., 1988, 1-21.
Gladman, A. Sydney, et al., "Biomimetic 4D printing", Nature Materials, vol. 15, Macmillan Publishers Limited, Jan. 25, 2016, 413-418.
Glunz, S. W., et al., "High-efficiency crystalline silicon solar cells", Advances in OptoElectronics, 2007, 1-28.
Grylls, Richard J., "Biomimetic Hybrid Implants by Laser Deposition", National Medical Technology Testbed Application, May 14, 2001, 1, 8-18.
Harris, Daniel J., et al., "Marangoni Effects on Evaporative Lithographic Patterning of Colloidal Films", Langmuir, Vo. 24, No. 8, American Chemical Society, Mar. 4, 2008, 3681-3685.
Ingber, Donald E., et al., "Method, Apparatus, Design and Manufacture of Devices for Tissue Repair, Transplantation and Surgical Reconstruction", Provisional application filed in U.S. Patent and Trademark Office, Jun. 4, 1999.
Keicher, D. M., et al., "The Laser Forming of Metallic Components Using Particulate Materials", JOM, 1997, 51-54.
King, Bruce H., et al., "Aerosol Jet R Printing System for High Speed, Non-Contact Front Side Metallization of Silicon Solar Cells", 22nd European Photovoltaic Solar Energy Conference, Milan, Italy, 2007.
King, Bruce , et al., "M3D TM Technology: Maskless Mesoscale TM Materials Deposition", Optomec pamphlet, 2001.
Krassenstein, Brian , "Carbon3D Unveils Breakthrough CLIP 3D Printing Technology, 25-100X Faster", http://3dprint.com/51566/carbon3d-clip-3d-printing, Mar. 16, 2015.
Lewandowski, H. J., et al., "Laser Guiding of Microscopic Particles in Hollow Optical Fibers", Announcer 27, Summer Meeting—Invited and Contributed Abstracts, Jul. 1997, 89.
Lewis, Jennifer A., "Novel Inks for Direct-Write Assembly of 3-D Periodic Structures", Material Matters, vol. 3, No. 1, Aldrich Chemistry Company, 2008, 4-9.
Lourenco, Jorge Magner, et al., "Plasma Sintering of Unalloyed Iron: A Study of Surface Porosity", Materials Research, 2004, 269-275.
Marple, V. A., et al., "Inertial, Gravitational, Centrifugal, and Thermal Collection Techniques", Aerosol Measurement: Principles, Techniques and Applications, 2001, 229-260.
Mazumder, J. , et al., "The Direct Metal Deposition of H13 Tool Steel for 3-D Components", JOM, May 1997, 55-60.
Mette, A. , et al., "Increasing the Efficiency of Screen-Printed Silicon Solar Cells by Light-Induced Silver Plating", 2006 IEEE 4th World Conference on Photovoltaic Energy Conversion, May 7-12, 2006, Hawaii, May 2006.
Mette, A. , et al., "Metal Aerosol Jet Printing for Solar Cell Metallization", Progress in Photovoltaics: Research and Applications, Apr. 5, 2007, 621-627.
Mette, Ansgar , et al., "Novel Metal Jet Printing Technique for the Front Side Metallization of Highly Efficient Industrial Silicon Solar Cells", 21st European Photovoltaic Solar Energy Conference, Dresden, Germany, 2006.
Miller, Doyle , et al., "Maskless Mesoscale Materials Deposition", HDI, Sep. 2001, 1-3.
Nakai, Takashi , et al., "Fabrication of Three-Dimensional Objects Using Laser Lithography", Systems and Computers in Japan, 1989, 68-67.
Nanodimension , "The DragonFly 2020 3D Printer", http://www.nano-di.com/3d-printer, 2015.
Nordson , "Fluid Dispensing Systems and Equipment", http://www.nordson.com/en/divisions/asymtek/products/fluid-dispensing-systems?nor_division_facet_b=f65ab511444f4ce087bae3fb19491a82, 2015.
Nscrypt, "3D Printing", http://nscrypt.com/3d-printing, 2015.
Nscrypt, "3DN HP Series", http://www.nscrypt.com/3d-printing, 2015.
Nscrypt, "3DN Series", http://www.nscrypt.com/3d-printing, 2015.
Nscrypt , "nFD Specification Sheet", http://www.nscrypt.com/3d-printing, 2015.
Nscrypt, "SmartPump 100 Specification Sheet", http://www.nscrypt.com/3d-printing, 2015.
Odde, D. J., et al., "Laser-Based Guidance of Cells Through Hollow Optical Fibers", The American Society for Cell Biology Thirty-Seventh Annual Meeting, Dec. 17, 1997.
Odde, D. J., et al., "Laser-guided direct writing for applications in biotechnology", Trends in Biotechnology, Oct. 1999, 385-389.
O'Reilly, Mike , et al., "Jetting Your Way to Fine-pitch 3D Interconnects", Chip Scale Review, Sep./Oct. 2010, 18-21.
Pease, III, Leander F., "Rapid Prototyping of P/M Parts and Tooling", Innovative & Emerging Technologies Seminar, Dec. 3, 1998, 2, 5, 15-16.
Rao, N. P., et al., "Aerodynamic Focusing of Particles in Viscous Jets", J. Aerosol Sci., 1993, 879-892.
Renn, M. J., et al., "Evanescent-wave guiding of atoms in hollow optical fibers", Physical Review A, Feb. 1996, R648-R651.
Renn, Michael J., et al., "Flow- and Laser-Guided Direct Write of Electronic and Biological Components", Direct-Write Technologies for Rapid Prototyping Applications, 2002, 475-492.
Renn, M. J., et al., "Laser-Guidance and Trapping of Mesoscale Particles in Hollow-Core Optical Fibers", Physical Review Letters, Feb. 15, 1999, 1574-1577.
Renn, M. J., et al., "Laser-Guided Atoms in Hollow-Core Optical Fibers", Physical Review Letters, Oct. 30, 1995, 3253-3256.
Renn, M. J., et al., "Optical-dipole-force fiber guiding and heating of atoms", Physical Review A, May 1997, 3684-3696.
Renn, M. J., et al., "Particle Manipulation and Surface Patterning by Laser Guidance", Submitted to EIPBN '98, Session AM4, 1998.
Renn, M. J., et al., "Particle manipulation and surface patterning by laser guidance", Journal of Vacuum Science & Technology B, Nov./Dec. 1998, 3859-3863.
Sammarco, Carmine , et al., "Metals Having Improved Microstructure and Method of Making", U.S. Provisional Patent Application filed in U.S. Patent Office, May 15, 2001.
Smugeresky, J. E., et al., "Laser Engineered Net Shaping (LENS TM) Process: Optimization of Surface Finish and Microstructural Properties", Jun. 30, 1997, 1-11.
Smugeresky, J. E., et al., "Using the Laser Engineered Net Shaping (LENS TM) Process to Produce Complex Components from a CAD Solid Model", Proceedings of the SPIE—The International Society for Optical Engineering, Lasers as Tools for Manufacturing, II, Feb. 12-17, 1997, 3-9.
Sobeck, et al., "Technical Digest: 1994 Solid-State Sensor and Actuator Workshop", 1994, 647.
Stratasys , "FDM Technology", http://www.stratasys.com/3d-printers/technologies/fdm-technology, 2015.
Stratasys , "PolyJet Technology", http://www.stratasys.com/3d-printers/technologies/polyjet-technology, 2015.
TSI Incorporated , "How A Virtual Impactor Works", www.tsi.com, Sep. 21, 2001.
Vanheusden, Karel , et al., "Direct Printing of Interconnect Materials for Organic Electronics", IMAPS ATW Printing for an Intelligent Future, Mar. 8-10, 2002, 1-5.
Wikipedia , "Continuous Liquid Interface Production", https://www.en.wikipedia.org/wiki/Continuous_Liquid_Interface_Production, Sep. 29, 2015.
Wikipedia , "Selective laser sintering", https://en.wikipedia.org/wiki/Selective_laser_sintering, Nov. 23, 2015.
Wikipedia , "Stereolithography", https://en/wikipedia/org/wiki/Stereolithography, Feb. 4, 2016.

(56) References Cited

OTHER PUBLICATIONS

Zhang, Xuefeng , et al., "A Numerical Characterization of Particle Beam Collimation by an Aerodynamic Lens-Nozzle System: Part I. An Individual Lens or Nozzle", Aerosol Science and Technology, 2002, 617-631.

* cited by examiner

HIGH RELIABILITY SHEATHED TRANSPORT PATH FOR AEROSOL JET DEVICES

CROSS-REFERENCE TO RELATED APPLICATIONS

This application claims priority to and the benefit of the filing of U.S. Provisional Patent Application No. 63/181,736, entitled "HIGH RELIABILITY SHEATHED TRANSPORT PATH FOR AEROSOL JET DEVICES", filed on Apr. 29, 2021, the entirety of which is incorporated herein by reference.

BACKGROUND OF THE INVENTION

Field of the Invention (Technical Field)

The present invention is related to apparatuses and methods for propagating an aerosol stream and pneumatic shuttering of an aerosol stream. The aerosol stream can be a droplet stream, a solid particle stream, or a stream comprising droplets and solid particles or droplets that contain solid particles.

BACKGROUND ART

Note that the following discussion may refer to a number of publications and references. Discussion of such publications herein is given for more complete background of the scientific principles and is not to be construed as an admission that such publications are prior art for patentability determination purposes.

Some aerosol jet deposition systems add a sheath of gas to the aerosol flow just prior to the deposition nozzle to focus the aerosol beam, accelerate the flow and to protect the inside of the nozzle. The upstream interior portion of the aerosol delivery path from the aerosol generation source prior to the sheath addition is in contact with the aerosol and is susceptible to failures caused by material build up. This portion of the mist path may include mist tubes or channels, junctions, pneumatic shutter components, or other portions of the mist path. Surfaces exposed to the aerosol risk potential material build up which can alter flow geometry and degrade system performance. Accumulation of deposition material in the transport path can result in print material output variation and print geometry errors. If enough material accumulates, a catastrophic failure occurs resulting in complete blockage of the aerosol flow. Failures resulting from material build up tend to be statistical in nature, are strongly affected by print material rheology, and are difficult to predict, making the design of material agnostic systems with run times greater than 4-8 hours difficult to accomplish. Thus, there is a need for a high reliability aerosol delivery path that can run for more than 24 hours capable of supporting typical transport path functionality such as, but not limited to, internal pneumatic shuttering.

SUMMARY OF THE INVENTION (DISCLOSURE OF THE INVENTION)

An embodiment of the present invention is a method for controlling deposition of an aerosol, the method comprising: supplying an aerosol to a transport tube in a deposition apparatus; surrounding the exterior of the transport tube with a transport sheath gas; surrounding the aerosol with the transport sheath gas before the aerosol enters the transport tube; transporting the aerosol and surrounding transport sheath gas to a switching chamber of the deposition apparatus; exhausting a boost gas and an exhaust sheath gas from the deposition apparatus: surrounding both the aerosol and the transport sheath gas with a deposition sheath flow to form a combined flow; passing the combined flow through a deposition nozzle; switching a flow path of the boost gas so it is added to the deposition sheath flow instead of being exhausted from the deposition apparatus, thereby stopping a flow of the aerosol into the deposition nozzle; and exhausting the aerosol from the deposition apparatus. The pressure in the switching chamber preferably remains approximately constant while performing the method. The gas flow rate through the deposition nozzle is preferably approximately constant while performing the method. The aerosol is preferably surrounded by at least one sheath gas until the step of exhausting the aerosol from the deposition apparatus, thereby preventing the aerosol from accumulating on surfaces of an aerosol transport path through the deposition apparatus. The step of exhausting the boost gas and the exhaust sheath gas from the deposition apparatus preferably comprises passing the boost gas and the exhaust sheath gas through an exhaust nozzle. The step of exhausting the aerosol from the deposition apparatus preferably comprises surrounding the aerosol with the exhaust sheath gas before the aerosol passes through the exhaust nozzle. The flow rate through the exhaust nozzle is preferably approximately constant while performing the method.

The time required to switch the aerosol from flowing toward the deposition nozzle to flowing toward the exhaust of the deposition apparatus is preferably less than approximately 1 ms. The time required for the flow of aerosol to stop exiting the deposition nozzle after the switching step is preferably less than approximately 10 ms. The method of claim 1 preferably further comprises switching back a flow path of the boost gas so it is exhausted from the deposition apparatus instead of being added to the deposition sheath flow, thereby starting a flow of the aerosol toward the deposition nozzle; and passing the combined flow through the deposition nozzle. The time required to switch the aerosol from flowing toward an exhaust of the deposition apparatus to flowing toward the deposition nozzle is preferably less than approximately 1 ms. The time required for a predetermined flow of aerosol to exit the deposition nozzle after the switching back step is preferably less than approximately 10 ms. The method optionally further comprises dividing the transport sheath gas into an exhaust portion and a deposition portion after the transporting step so that the combined flow comprises the aerosol surrounded by the deposition portion, both being surrounded by the deposition sheath flow. In this case the step of exhausting a boost gas and an exhaust sheath gas from the deposition apparatus preferably comprises surrounding the exhaust portion with the boost gas and exhaust sheath gas and exhausting the exhaust portion, the boost gas, and the exhaust sheath gas from the deposition apparatus.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention. In the drawings.

DETAILED DESCRIPTION OF EMBODIMENTS OF THE INVENTION

Embodiments of the present invention are apparatuses and methods for propagation and diversion of an aerosol stream for use in, but not limited to, aerosol jet printing of material onto planar and three-dimensional surfaces. As used throughout the specification and claims, the term "aerosol" means liquid droplets (which may optionally contain solid material in suspension), fine solid particles, or mixtures thereof, which are transported by a carrier gas.

In one or more embodiments of the present invention an aerosol delivery path is incorporated into an apparatus which transports material from an aerosol source, such as an ultrasonic or pneumatic atomizer, to a deposition nozzle. Prior to entering the deposition nozzle, a concentric sheath of gas is applied to surround the aerosol stream. As the combined stream flows through the nozzle, focusing of the aerosol occurs, resulting in deposition of printed features as small as 10 μm in width. In one or more embodiments of the present invention, an internal pneumatic shutter for diverting the material flow is used in coordination with movement of the deposition nozzle relative to the print substrate resulting in deposition of desired print features. Example internal pneumatic shuttering systems are described in more detail in commonly-owned U.S. Pat. No. 10,632,746, incorporated herein by reference.

Figure 1:
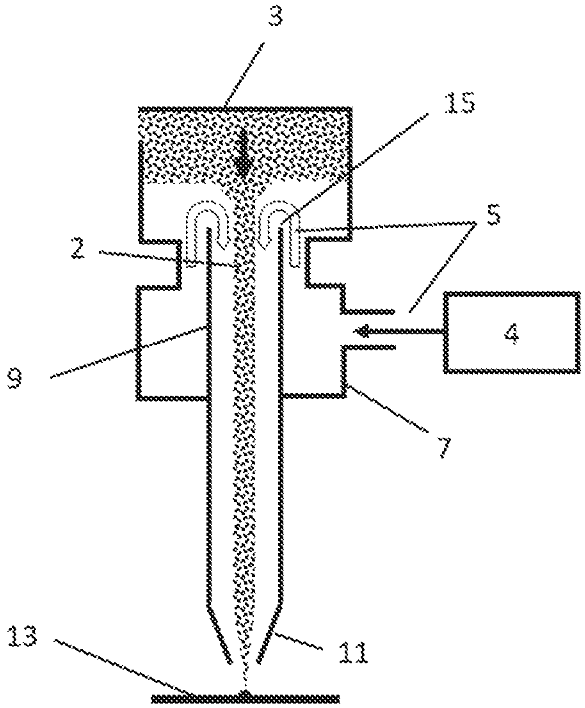
FIG. 1 is a schematic of an embodiment of aerosol jet print engine aerosol transport path showing flows and aerosol distribution.

An aerosol transport path comprising an embodiment of a sheathed aerosol transport path for a print engine of the present invention is shown in FIG. 1. An aerosol source, such as a pneumatic atomizer, generates aerosol 2 and delivers it to mist chamber 3. Mass flow controller 4, connected to a compressed gas supply (not shown), supplies master sheath gas 5, preferably through a mass flow controller, which enters master sheath gas plenum 7 and is circumferentially injected into the mist chamber 3 around the outside diameter of mist tube 9. Flows in the transport path are preferably low enough to insure laminar flow. Master sheath gas 5 remains in contact with mist tube 9 and flows over top surface 15 of mist tube 9, surrounding aerosol 2 and separating it from all surfaces of mist tube 9. Aerosol 2 and master sheath gas 5 form a preferably annular, axisymmetric, layered flow that travels down mist tube 9 to deposition nozzle 11, where it is constricted and/or focused, causing it to accelerate. The high velocity aerosol exits deposition nozzle 11 and impacts on print surface 13, resulting in deposition of desired features. All surfaces of mist tube 9 are covered with a flow of master sheath gas 5, and at no point are they in contact with aerosol 2, thus preventing any opportunity for material buildup.

Figure 2:
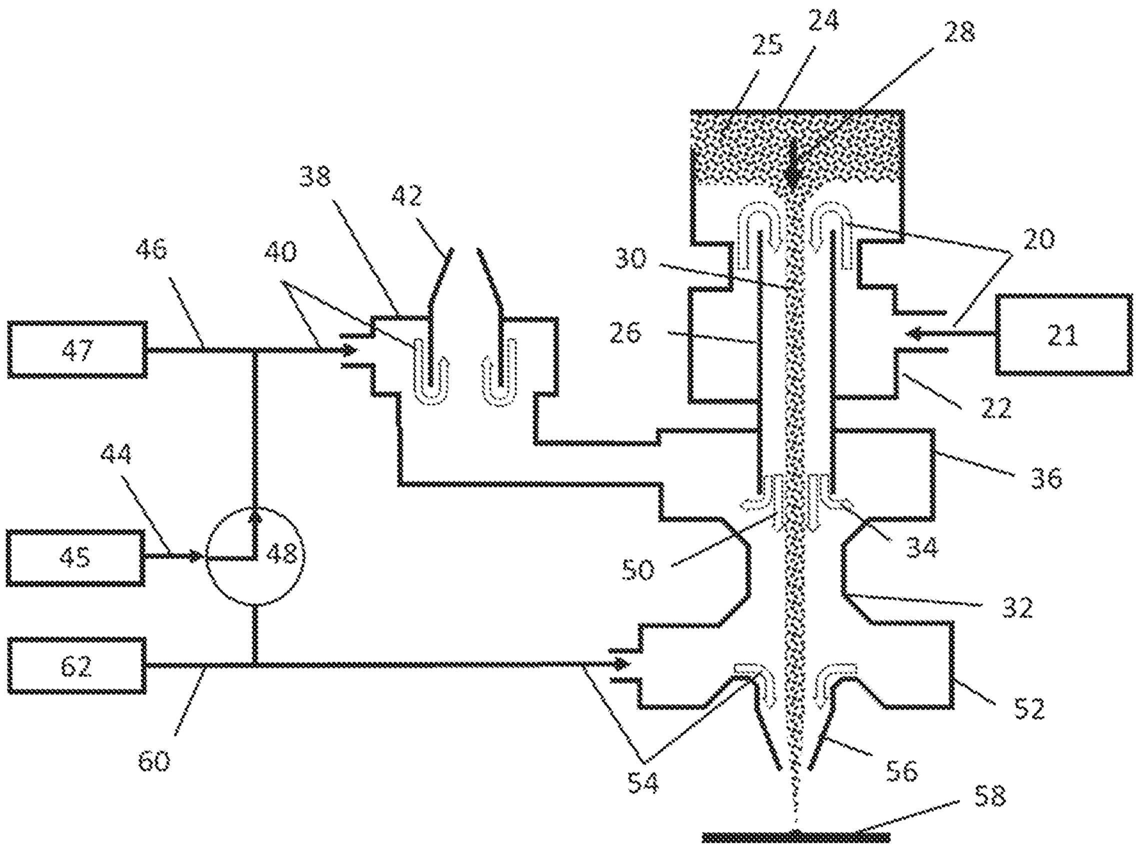
FIG. 2 is a schematic of an embodiment of aerosol jet print engine aerosol transport path incorporating an internal pneumatic shutter showing flows and aerosol distribution in the deposition configuration.

In an alternative embodiment of the current invention, an internal pneumatic shutter is incorporated in the mist delivery path and is shown in FIG. 2. Similar to the system of FIG. 1, an aerosol source generates aerosol 25 and delivers it to mist chamber 24. Master sheath gas flow 20, preferably provided by a sheath mass flow controller 21 connected to a compressed gas supply, enters master sheath gas plenum 22 and is circumferentially injected into the mist chamber 24 around the outside diameter of mist tube 26 and propagates down the inside of mist tube 26 in the direction of the arrow 28 surrounding aerosol flow 30. Aerosol flow 30 and master sheath gas flow 20 preferably remain constant during diverting, printing, and switching (described below). Aerosol flow 30 and master sheath gas flow 20 exit mist tube 26 and propagate into switching gallery 32. Exhaust sheath flow portion 34 of the master sheath gas flow enters exhaust plenum 36 and propagates to exhaust sheath plenum 38, where it is preferably surrounded with exhaust sheath flow 40 and expelled out exhaust nozzle 42. Exhaust sheath flow 40 is a combination of the exhaust fill flow 46, preferably provided by an exhaust fill mass flow controller 47 connected to a compressed gas supply, and boost flow 44, preferably provided by a boost mass flow controller 45 connected to a compressed gas supply, which is directed into exhaust sheath flow 40 through valve 48. Aerosol flow 30 and the remaining sheath flow portion 50 of the master sheath gas flow propagate through switching gallery 32 and past sheath-boost plenum 52, where sheath-boost flow 54 is circumferentially added. Aerosol flow 30, remaining sheath flow portion 50, and sheath-boost flow 54 enter deposition nozzle 56. Sheath-boost flow 54 and remaining sheath flow portion 50 prevent aerosol flow 30 from contacting the walls of the mist path and assist in accelerating and focusing aerosol flow 30 into a focused beam as it exits deposition nozzle 56 to insure precise and controlled impaction on print surface 58. Deposition sheath flow 60, which in this configuration is the same as sheath-boost flow 54, is preferably provided by deposition sheath mass flow controller 62 connected to a compressed gas supply. Switching gallery 32 is preferably directly connected to sheath-boost plenum 52, without requiring the use of a mist tube to connect the flows in each chamber.

Figure 3:
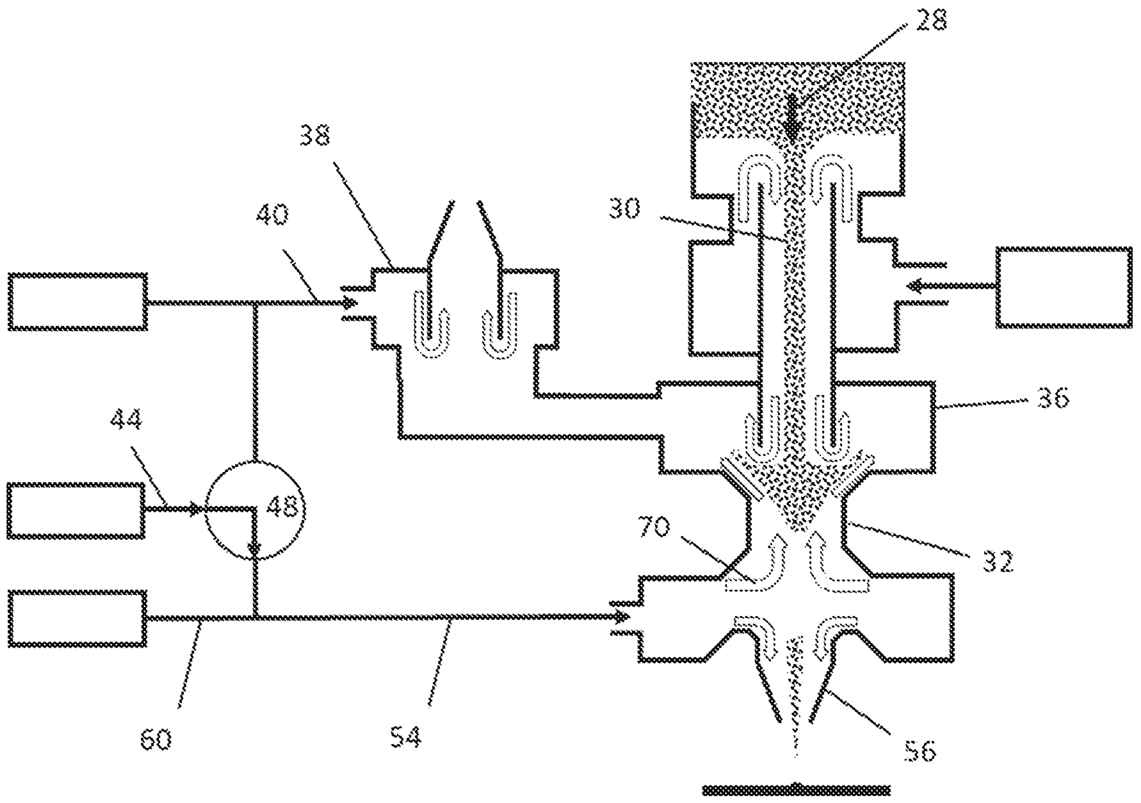
FIG. 3 is a schematic of the flows and aerosol distribution of the system of FIG. 2 in at the initiation of the diversion configuration.

Initiation of the process for diverting the aerosol flow, shown in FIG. 3, is caused by actuating valve 48 so that boost flow 44 is removed from the exhaust sheath flow 40 and is added to deposition sheath flow 60 to augment sheath-boost flow 54. Since the flow out of deposition nozzle 56 is preferably constant, reverse boost flow 70 is forced to flow away from deposition nozzle 56, opposing the flow of the aerosol flow 30 and reversing its direction. Nearly simultaneously, the absence of boost flow 44 into exhaust sheath plenum 38 causes the flow out of exhaust plenum 36 to be increased by the amount of boost flow 44, aiding in the reversal of the flow fields associated with the reversing aerosol flow 30. Since the resistances of the nozzles remain constant and the total flow into mist delivery system remains substantially constant, the pressure in the switching gallery 32 remains substantially constant. Constant pressure operation ensures constant aerosol output at deposition nozzle 56 and avoids delays associated with waiting for the system to reach pressure equilibrium. Constant pressure operation enables redirection of the aerosol flow in the switching gallery 32 in less than about 1 ms. The aerosol remaining in deposition nozzle 56 is expelled less than about 10 ms after boost flow 44 is switched.

Figure 4:
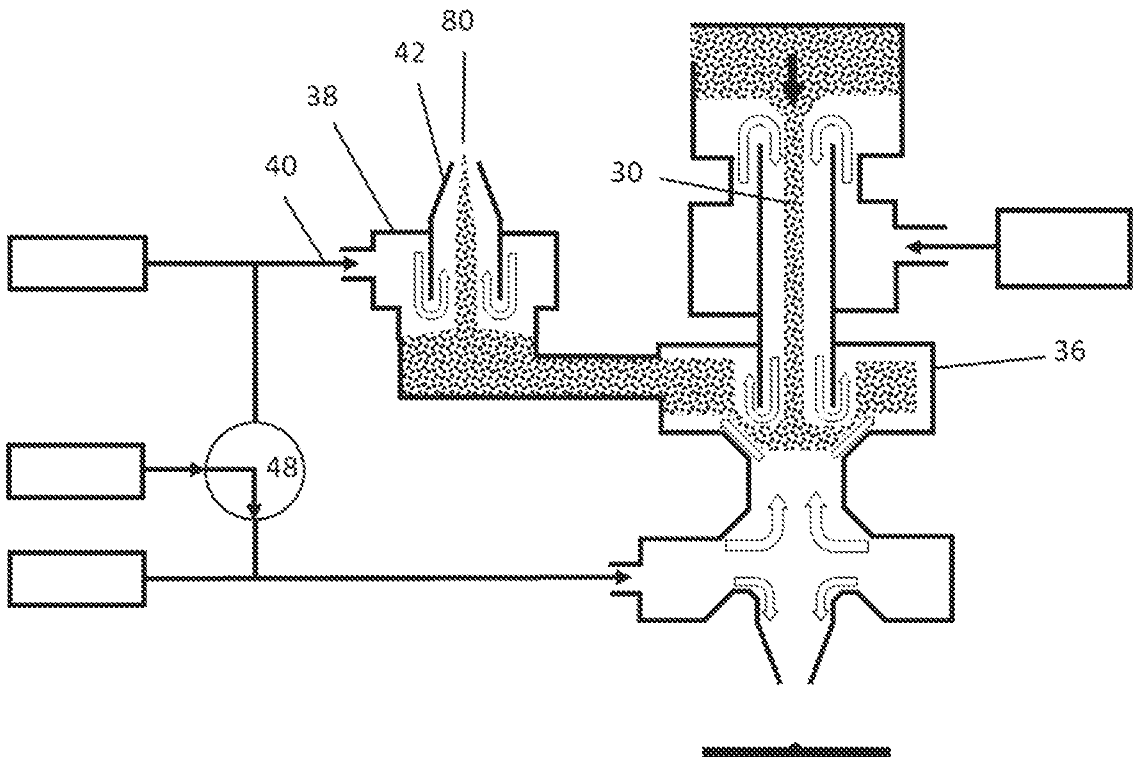
FIG. 4 is a schematic of the flows and aerosol distribution of the system of FIG. 2 in the diversion configuration.

When valve 48 remains in the divert state, the steady divert state shown in FIG. 4 is achieved. In the divert state, aerosol 30 propagates through exhaust plenum 36, up to exhaust sheath plenum 38 where exhaust sheath flow 40 is added circumferentially to aerosol flow 30 and combined flow 80 is expelled through exhaust nozzle 42. Similar to the operation of the deposition nozzle, the addition of exhaust sheath flow 40 prevents aerosol flow 30 from contacting exhaust nozzle 42.

Figure 5:
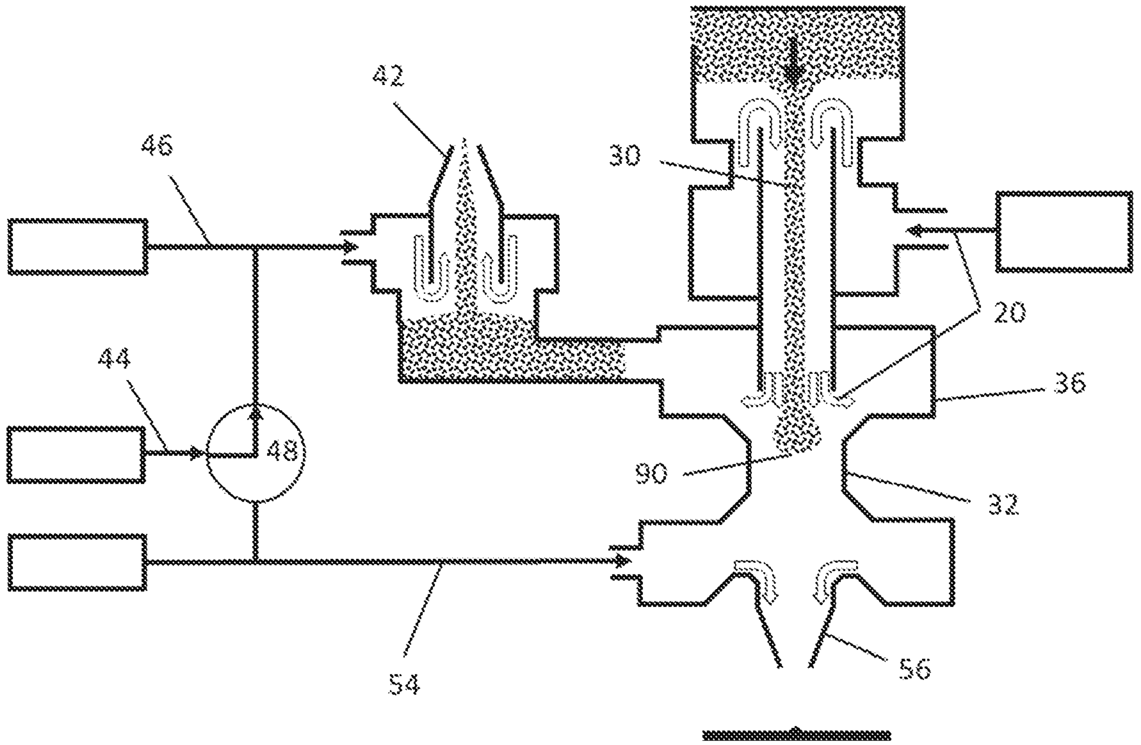
FIG. 5 is a schematic of the flows and aerosol distribution of the system of FIG. 2 at the initiation of the deposition configuration.

Resumption of deposition, shown in FIG. 5, is initiated by switching valve 48 to cause boost flow 44 to be combined with exhaust fill flow 46, thereby decreasing the flow out of exhaust plenum 36 by the amount of boost flow 44. All of the aerosol flow, plus a portion of master sheath flow 20, enters switching gallery 32. Nearly simultaneously, valve 48 actuation causes sheath boost flow 54 to be decreased by an amount equal to boost flow 44, which removes opposition to aerosol flow 30 through the switching gallery 32, and aerosol front 90 resumes propagation in the direction of deposition nozzle 56. Since the transport path preferably operates at approximately a constant pressure, exhaust nozzle 42 and deposition nozzle 56 have constant flow through them.

The pressure inside the transport path is a consequence of the flow generated by the mass flow controllers through the resistances presented by the nozzles. Since the mass flow controllers provide substantially constant flow and the nozzles provide substantially constant resistance at that flow, the pressure throughout remains substantially constant. Three-way valve 48 switches the boost flow entry point into the transport path, but the total inflow and the flow out through each of the nozzles remain substantially constant; the aerosol flow is simply switched from one nozzle to the other.

Figure 6:
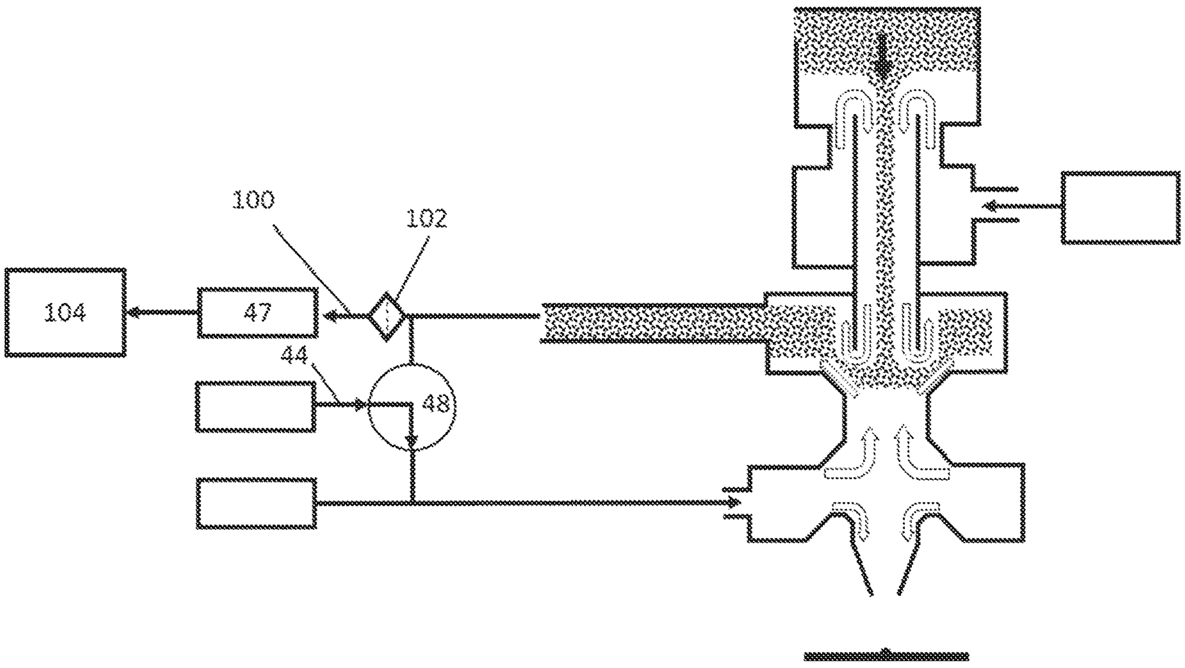
FIG. 6 is a schematic of the flows and aerosol distribution of the system of FIG. 2 in the diversion configuration with a mass flow controller-based exhaust configuration.

Although exhaust nozzle 42 is the preferred exhaust configuration because of its simplicity and reliability, an alternative configuration that generates a constant flow at the exhaust outlet is shown in FIG. 6. Vacuum pump 104 presents a negative pressure to exhaust fill mass flow controller 47 which extracts exhaust fill mass flow controller flow 100 preferably through filter 102. The flow through exhaust fill mass flow controller 47 remains substantially constant. While diverting, valve 48 prevents boost flow 44 from combining with exhaust fill mass flow controller flow 100, resulting in higher flow out of the exhaust plenum, supporting the diversion process. If valve 48 is switched to so that it augments exhaust fill mass flow controller flow 100 with supply boost flow 44, thereby reducing the flow out of the exhaust plenum by the amount of boost flow 44, the system is switched to the deposition process and deposition is initiated.

Figure 7:
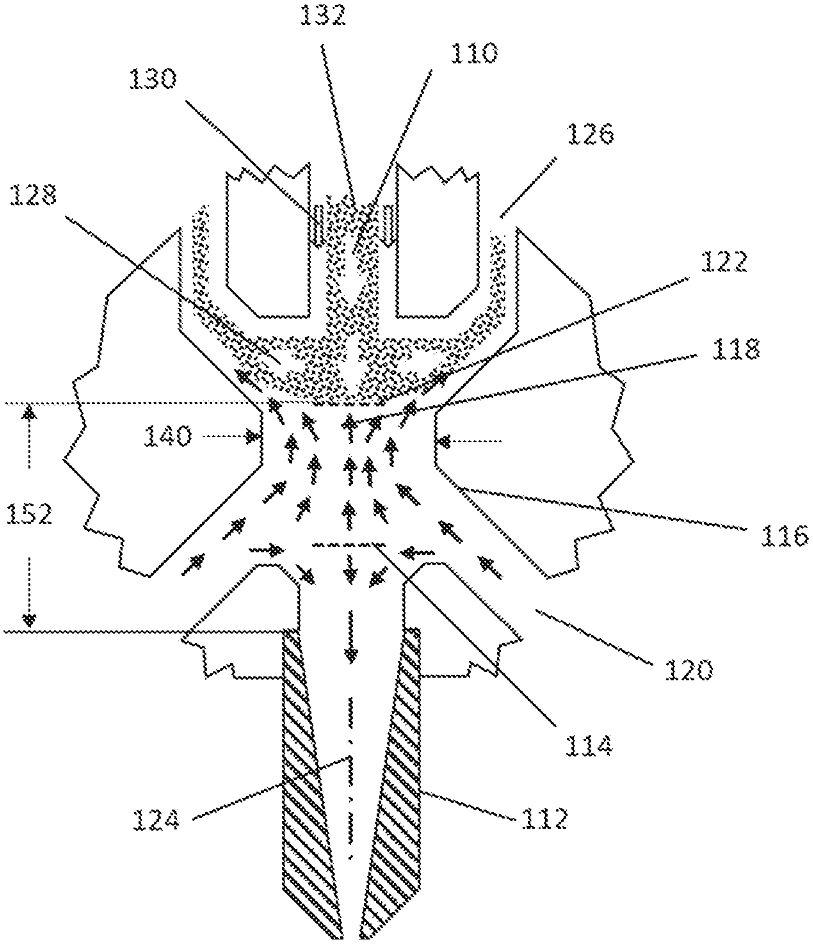
FIG. 7 is a geometric representation indicating the flow distribution and some dimensions of the switching gallery of the present invention in the diversion configuration.

The flows through the switching gallery during diversion are shown in FIG. 7. While diverting, the movement of aerosol 132 in aerosol flow 110 in the direction of deposition nozzle 112 nozzle is stopped at a location near central axis 124 of switching gallery 116. The velocity of blocking flow 118 from sheath boost inlet 120 is preferably equal and opposite to aerosol flow 110, resulting in mist front stagnation plane 122, preferably perpendicular to central switching gallery axis 124. Aerosol flow 110 is suspended at this stagnation plane and is diverted radially outward to exhaust outlet 126. Radial aerosol flow 128 in the exhaust channel is sheathed by blocking flow 118 along the surface of switching gallery 116 that faces deposition nozzle 112 and sheathed by master sheath flow 130 on the opposite surfaces, preventing contact between both aerosol flow 110 and radial aerosol flow 128 and the inner walls of switching gallery 116, thus avoiding material build up and associated system failures. Concurrently, nozzle stagnation plane 114 is parallel to mist front stagnation plane 122 and positioned between mist front stagnation plane 122 and the entrance to deposition nozzle 112. The shape and size of switching gallery 116 and the magnitude of the flows entering and exiting the gallery determine the locations of and distance between mist front stagnation plane 122 and nozzle stagnation plane 114 and consequently defining how abruptly the propagation of the aerosol flow to the deposition nozzle is interrupted and resumed.

The rates of interruption and resumption of the aerosol flow are herein referred to as the fade in and out times respectively. Fade in and out times are minimally bounded by the speed at which the flow fields inside the switching gallery reconfigure to establish or eliminate stagnation plane 122 and nozzle stagnation plane 114 due to boost flow switching by valve 48. Simulation predicts that flow field reconfiguration occurs at much less than 1 ms, resulting in fade in and fade out times less than 1 ms given appropriate flow rates and the valve switching speed. Very low fade in and out times such as these enable switching rates of hundreds of hertz given appropriate valve switching speeds. Fast fade in and out times are very important in applications where printing sequences of dots or dashes at high speeds are desired. In these applications, the maximum print speed and the number of features that can be printed per second is directly limited by the fade in and fade out times. The print velocity must be constrained so that fading in or out does not create an indistinct or smeared edge to the feature. Fade in and out times are independent of how long it takes the modulated aerosol front to propagate through the rest of the transport path and out of the deposition nozzle. In contrast, delay times (on and off) include the fade times and the time necessary for the aerosol front to propagate through the deposition nozzle and impact on the substrate surface as well as valve switching times.

The switching gallery is preferably axisymmetric in shape and central switching gallery diameter 140 determines the velocity profile for a given flow rate. The velocity profile through the center of switching gallery 116 is inversely proportional to the square of its diameter. The time it takes from switching a flow to initiate deposition until the aerosol flow is completely on is herein referred to as the on delay, and the time it takes from switching a flow to divert the aerosol until no aerosol is exiting the nozzle is referred to as the off delay. When switching from the diversion state to the deposition state, the time taken for the aerosol flow 110 to traverse distance 152 from mist front stagnation plane 122 along central switching gallery axis 124 to the entrance of deposition nozzle 112 represents the majority of the on delay. Minimizing distance 152 enables minimization of the on delay. Minimizing distance 152 also minimizes the distance between the boost flow inlet and mist front stagnation plane 122, which is beneficial for minimal off delay.

In one embodiment of the present invention, due to elimination of the mist tube separating the switching chamber from the boost flow chamber that was required in previous devices, distance 152 is 2.8 mm, corresponding to an on delay of less than about 6 ms, which is greater than an 80% reduction in length relative to previous internal pneumatic shutter designs and a commensurate reduction in on delay relative to the two designs. Fine feature printing of less than about 10 μm feature sizes in width typically require very low flow rates but still require high speed shuttering (diversion), with on and off delays <10 ms. Reducing switching gallery diameter 140 along with distance 152 supports <10 ms on and off times at flows needed for fine feature printing.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A method for controlling deposition of an aerosol, the method comprising:

supplying an aerosol to a transport tube in a deposition apparatus;

surrounding the exterior of the transport tube with a transport sheath gas;

surrounding the aerosol with the transport sheath gas before the aerosol enters the transport tube;

transporting the aerosol and surrounding transport sheath gas to a switching chamber of the deposition apparatus;

exhausting a boost gas and an exhaust sheath gas from the deposition apparatus;

surrounding both the aerosol and the transport sheath gas with a deposition sheath flow to form a combined flow;

passing the combined flow through a deposition nozzle;

switching a flow path of the boost gas so it is added to the deposition sheath flow instead of being exhausted from the deposition apparatus, thereby stopping a flow of the aerosol into the deposition nozzle; and exhausting the aerosol from the deposition apparatus.

2. The method of claim 1 wherein a pressure in the switching chamber remains approximately constant while performing the method.

3. The method of claim 1 wherein a gas flow rate through the deposition nozzle is approximately constant while performing the method.

4. The method of claim 1 wherein the aerosol is surrounded by at least one sheath gas until the step of exhausting the aerosol from the deposition apparatus, thereby preventing the aerosol from accumulating on surfaces of an aerosol transport path through the deposition apparatus.

5. The method of claim 1 wherein the step of exhausting the boost gas and the exhaust sheath gas from the deposition apparatus comprises passing the boost gas and the exhaust sheath gas through an exhaust nozzle.

6. The method of claim 5 wherein the step of exhausting the aerosol from the deposition apparatus comprises surrounding the aerosol with the exhaust sheath gas before the aerosol passes through the exhaust nozzle.

7. The method of claim 6 wherein a flow rate through the exhaust nozzle is approximately constant while performing the method.

8. The method of claim 1 wherein a time required to switch the aerosol from flowing toward the deposition nozzle to flowing toward an exhaust of the deposition apparatus is less than approximately 1 ms.

9. The method of claim 1 wherein a time required for a flow of aerosol to stop exiting the deposition nozzle after the switching step is less than approximately 10 ms.

10. The method of claim 1 further comprising:

switching back a flow path of the boost gas so it is exhausted from the deposition apparatus instead of being added to the deposition sheath flow, thereby starting a flow of the aerosol toward the deposition nozzle; and passing the combined flow through the deposition nozzle.

11. The method of claim 10 wherein a time required to switch the aerosol from flowing toward an exhaust of the deposition apparatus to flowing toward the deposition nozzle is less than approximately 1 ms.

12. The method of claim 10 wherein a time required for a predetermined flow of aerosol to exit the deposition nozzle after the switching back step is less than approximately 10 ms.

13. The method of claim 1 further comprising dividing the transport sheath gas into an exhaust portion and a deposition portion after the transporting step so that the combined flow comprises the aerosol surrounded by the deposition portion, both being surrounded by the deposition sheath flow.

14. The method of claim 13 wherein the step of exhausting a boost gas and an exhaust sheath gas from the deposition apparatus comprises surrounding the exhaust portion with the boost gas and exhaust sheath gas and exhausting the exhaust portion, the boost gas, and the exhaust sheath gas from the deposition apparatus.

* * * * *